US008468344B2

(12) United States Patent
Teijido et al.

(10) Patent No.: US 8,468,344 B2
(45) Date of Patent: Jun. 18, 2013

(54) ENABLING MULTI-LEVEL SECURITY IN A SINGLE-LEVEL SECURITY COMPUTING SYSTEM

(75) Inventors: Daniel Teijido, Clearwater, FL (US); Randall S. Brooks, Apollo Beach, FL (US)

(73) Assignee: Raytheon Company, Waltham, MA (US)

( * ) Notice: Subject to any disclaimer, the term of this patent is extended or adjusted under 35 U.S.C. 154(b) by 292 days.

(21) Appl. No.: 12/787,108

(22) Filed: May 25, 2010

(65) Prior Publication Data

US 2010/0306534 A1 Dec. 2, 2010

Related U.S. Application Data

(60) Provisional application No. 61/181,167, filed on May 26, 2009.

(51) Int. Cl.
*H04L 9/00* (2006.01)
(52) U.S. Cl.
USPC ............. 713/166; 713/165; 726/13; 726/1; 707/705
(58) Field of Classification Search
USPC ............. 713/166, 165; 726/1, 13; 707/705
See application file for complete search history.

(56) References Cited

U.S. PATENT DOCUMENTS

| 6,775,781 B1 * | 8/2004 | Phillips et al. ............ 726/4 |
| 6,981,140 B1 | 12/2005 | Choo |
| 7,178,015 B2 | 2/2007 | Shaw et al. |
| 7,409,487 B1 | 8/2008 | Chen et al. ............... 711/6 |
| 7,412,579 B2 | 8/2008 | O'Connor et al. |
| 7,412,702 B1 | 8/2008 | Nelson et al. ............. 718/1 |
| 7,523,489 B2 | 4/2009 | Bossemeyer et al. |
| 7,676,673 B2 | 3/2010 | Weller et al. ............. 713/164 |

(Continued)

FOREIGN PATENT DOCUMENTS

| EP | 0 849 680 A2 | 6/1998 |
| WO | WO2010/1338537 A1 | 12/2010 |

OTHER PUBLICATIONS

PCT, Notification of Transmittal of the International Search Report and the Written Opinion of the International Searching Authority, or the Declaration, International Application No. PCT/US2010/036125, 13 pages, Aug. 25, 2010.

(Continued)

*Primary Examiner* — Beemnet Dada
*Assistant Examiner* — Sayed Beheshti Shirazi
(74) *Attorney, Agent, or Firm* — Daly, Crowley, Mofford & Durkee, LLP

(57) ABSTRACT

According to an embodiment, a system may comprise a mass storage device that is operable to be coupled to one or more processors. The mass storage device may comprise a base operating system that is operable to be executed by the one or more processors. The base operating system may be operable to implement a single security level. The mass storage device may also comprise a virtual operating system that is operable to be executed by the one or more processors. The virtual operating system may be executed using a virtualization tool that is executed by the base operating system. The virtual operating system may be operable to process information according to a plurality of security levels and communicate the information to one or more computing systems. The information may be communicated according to the plurality of security levels of the information.

18 Claims, 2 Drawing Sheets

U.S. PATENT DOCUMENTS

| | | | |
|---|---|---|---|
| 7,693,838 B2 * | 4/2010 | Morgan et al. | 707/781 |
| 7,734,916 B2 | 6/2010 | LiVecchi | 713/166 |
| 7,779,255 B2 | 8/2010 | LiVecchi | 713/166 |
| 7,840,763 B2 | 11/2010 | Murotake et al. | |
| 7,895,642 B1 | 2/2011 | Larson et al. | |
| 2002/0169987 A1 | 11/2002 | Meushaw et al. | |
| 2003/0196108 A1 | 10/2003 | Kung | |
| 2005/0257048 A1 * | 11/2005 | Willman | 713/165 |
| 2005/0268336 A1 | 12/2005 | Finnegan | |
| 2006/0064566 A1 | 3/2006 | Gostin et al. | |
| 2007/0112772 A1 * | 5/2007 | Morgan et al. | 707/9 |
| 2007/0245030 A1 * | 10/2007 | Das et al. | 709/229 |
| 2007/0294680 A1 * | 12/2007 | Papakipos et al. | 717/149 |
| 2008/0077993 A1 | 3/2008 | Zimmer et al. | |
| 2008/0148341 A1 * | 6/2008 | Ferguson et al. | 726/1 |
| 2009/0125902 A1 * | 5/2009 | Ghosh et al. | 718/1 |
| 2009/0276618 A1 * | 11/2009 | Madjlessi | 713/2 |
| 2009/0313446 A1 * | 12/2009 | Schuba et al. | 711/162 |
| 2010/0132011 A1 * | 5/2010 | Morris et al. | 726/1 |
| 2010/0293592 A1 | 11/2010 | Maximilien et al. | |
| 2010/0333193 A1 | 12/2010 | Goding et al. | |

OTHER PUBLICATIONS

Letter enclosing Examination Report dated Oct. 10, 2012 for New Zealand Application No. 595860, filed Oct. 19, 2011, 4 pages.

Pardo-Castellote et al.; "An Introduction to DDS and Data-Centric Communications;" Real-Time Innovations; Aug. 12, 2005; 15 pages.

Office Action dated Dec. 22, 2001; or U.S. Appl. No. 12/790,723; filed Jun. 24, 2009; 12 pages.

Response filed Mar. 31, 2012; to Office Action dated Dec. 22, 2001; or U.S. Appl. No. 12/790,723; filed Jun. 24, 2009; 8 pages.

Final Office Action dated Jun. 8, 2012; for U.S. Appl. No. 12/790,723; filed Jun. 24, 2009; 13 pages.

RCE and IDS dated Aug. 1, 2012 for U.S. Appl. No. 12/790,723, filed Jun. 24, 2009, 13 pages.

PCT Publ. No. WO2010/138537A1 dated Dec. 2, 2010, with Search Report dated Aug. 25, 2010 for PCT Application No. PCT/US2010/036125, 20 pages.

\* cited by examiner

ENABLING MULTI-LEVEL SECURITY IN A SINGLE-LEVEL SECURITY COMPUTING SYSTEM

RELATED APPLICATIONS

This application claims benefit under 35 U.S.C. §119(e) of U.S. Provisional Application Ser. No. 61/181,167, entitled "RETROFIT MULTI-LEVEL SECURITY COMPUTING SYSTEM," filed May 26, 2009 which is incorporated herein by reference.

TECHNICAL FIELD

This disclosure generally relates to computing systems and more specifically to enabling multi-level security in a single-level security computing system.

BACKGROUND

Multi-level security (MLS) is an aspect of computing system design in which information may be processed at differing security levels. A multi-level security architecture is generally dependent on implementation of a Trusted Computing Base (TCB) that has been designed to enforce security policies, such as user access control, mandatory access control (MAC), discretionary access control (DAC), and/or audit policy. Multi-level security computing systems allow one-way data flow between security domains that may otherwise be assumed to be isolated. Some computing systems may not natively possess an MLS architecture.

SUMMARY OF THE DISCLOSURE

According to an embodiment, a system may comprise a mass storage device that is operable to be coupled to one or more processors. The mass storage device may comprise a base operating system that is operable to be executed by the one or more processors. The base operating system may be operable to implement a single security level. The mass storage device may also comprise a virtual operating system that is operable to be executed by the one or more processors. The virtual operating system may be executed using a virtualization tool that is executed by the base operating system. The virtual operating system may be operable to process information according to a plurality of security levels and the information with one or more computing systems. The information may be communicated according to the plurality of security levels of the information. For example, according to one exemplary embodiment, a multi-level security computing system includes an external mass storage device that may be coupled to a personal computing system that normally executes an operating system operating at a single security level and which does not natively possess a multi-level security architecture. The external mass storage device stores a base operating system that is executable by the personal computing system. The base operating system executes a virtualization tool that, in turn, executes a virtual operating system. The virtual operating system processes information in the personal computing system at varying security levels, and communicates information at its particular security level with other computing systems coupled to the personal computing system through a network.

Some embodiments of the disclosure may provide technical advantages. For example, some embodiments may incorporate a mass storage device to enable multi-level security (MLS) for a computing system that does not natively support MLS. Some embodiments may enable a computing system that does not natively support MLS to communicate information according to multiple security levels with other computing systems. For example, in one exemplary embodiment, a multi-level security computing system may provide a retrofit solution for a computing system, such as a personal computing system, that does not support a trusted computing base. Such a multi-level computing system, according to one embodiment of the invention, incorporates a mass storage device (which is, in one embodiment, an external mass storage device) that stores a virtual operating system executable by the computing system (e.g., a personal computing system). When executed, the virtual operating system effects a virtual computing system that may provide a trusted computing base for operating within a multi-level security network. In accordance with another embodiment of the invention, a multi-level security computing system is provided b an external mass storage device storing a virtual operating system that may be executed by a personal computing system for implementing a multi-level security environment.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1-4 of the drawings, like numerals being used for like and corresponding parts of the various drawings.

Figure 1:
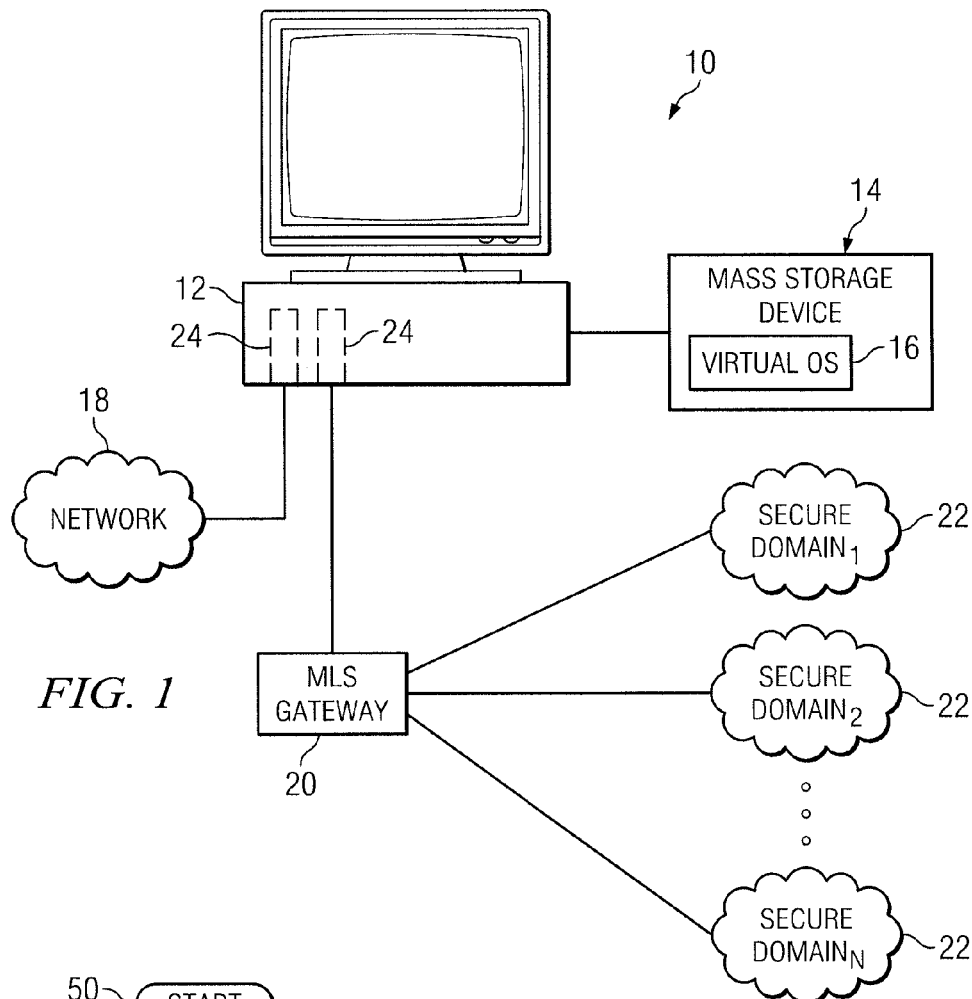
FIG. 1 depicts an example of a system that may utilize multi-level security (MLS)

FIG. 1 depicts an embodiment of a system 10 for enabling multi-level security (MLS) in a single-level security computing system. In the depicted embodiment, system 10 includes computing system 12, mass storage device 14, virtual operating system 16, local network 18, MLS gateway 20, secure domains 22, and network adaptors 24 coupled as shown.

In the illustrated example, system 10 may comprise a mass storage device 14 that is coupled to one or more processors of computing system 12. The mass storage device 14 may comprise a base operating system that is operable to be executed by the one or more processors. The base operating system may be operable to implement a single security level. The mass storage device 14 may also comprise a virtual operating system 16 that is operable to be executed by the one or more processors. The virtual operating system 16 may be executed using a virtualization tool that is executed by the base operating system. The virtual operating system may be operable to process information according to a plurality of security levels and communicate the information to one or more computing systems of secure domains 22. The information may be communicated according to the plurality of security levels of the information.

Computing system 12 may comprise a memory and one or more processors. The computing system 12 may be operable to execute one or more software programs. For example, processors of computing system 12 may execute a software program by executing code of the one or more software programs. In some embodiments, computing system 12 may be a personal computer, a laptop computer, a mainframe computer, a server, a personal digital assistant (PDA), or other suitable device.

In some embodiments, the computing system 12 may be coupled to mass storage device 14. For example, the computing system 12 and the mass storage device 14 may be coupled by an advanced technology attachment (such as eSATA, SATA, or PATA) connection, a universal serial bus (USB) connection, an Ethernet connection, or other suitable devices.

Mass storage device 14 may be any suitable computer-readable storage device, such as a magnetic drive, a solid state drive, a network drive, or other suitable device operable to store a plurality of executable software modules. In some embodiments, mass storage device 14 may be an internal hard drive of computing system 12, In other embodiments, mass storage device 14 may be an external hard drive coupled to computing system 12. In some embodiments, mass storage device 14 may store an image of virtual operating system 16. Mass storage device 14 is described in more detail with reference to FIG. 2.

Figure 2:
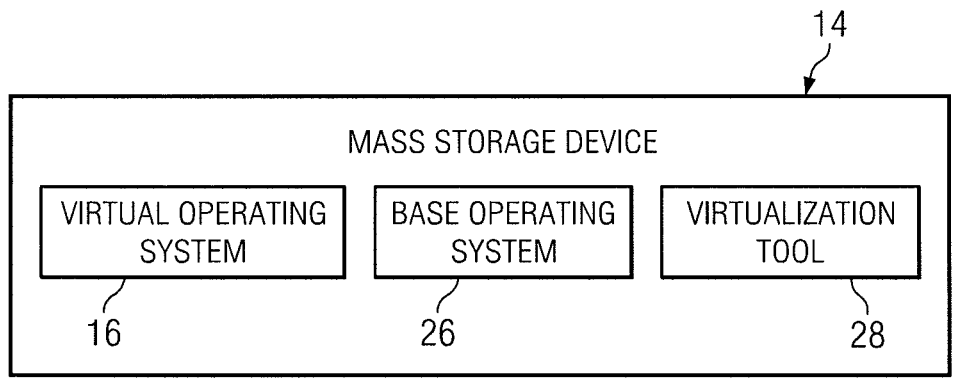
FIG. 2 depicts an example of a mass storage device.
Figure 4:
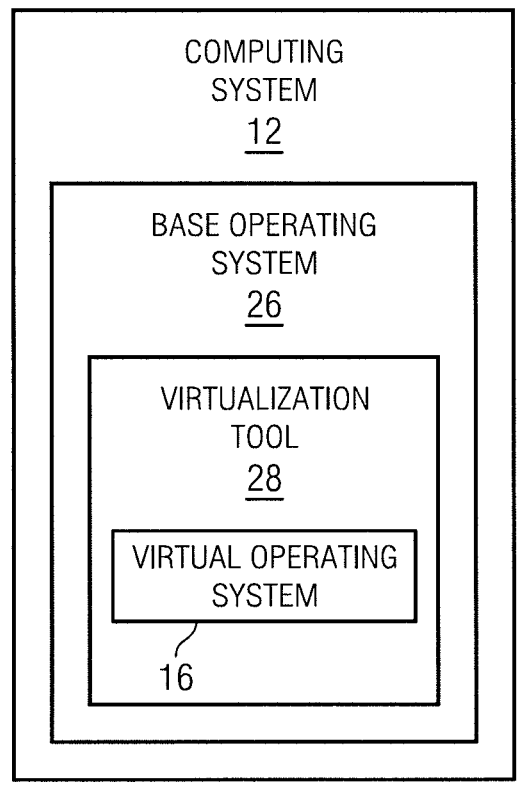
FIG. 4 depicts an example of a computing system.

FIG. 2 depicts an embodiment of a mass storage device 14. The mass storage device 14 may store software programs, such as base operating system 26, virtualization tool 28, and virtual operating system 16. Base operating system 26 may be the operating system that the computing system 12 normally executes. For example, base operating system 26 may be executed when computing system 12 boots up.

In some embodiments, base operating system 26 may lack an MLS architecture. Secure computing systems can incorporate a multi level security (MLS) architecture having a trusted computing base (TCB) that enforces various security policies, such as user access control, mandatory access control (MAC), discretionary access control (DAC), and/or audit policy. Communication of these secure computing systems with one another may be facilitated by a network that transfers these secure policies along with information to enforce security policies throughout the network. Some types of computing systems, however (e.g., some personal computing systems) may not natively include a TCB for communicating with other computing systems using an MLS architecture. Accordingly, a computing system 12 that executes base operating system 26 that lacks an MLS architecture may be natively capable of implementing only one level of security. In some embodiments, computing system 12 may be a MACINTOSH™ personal computer (produced by APPLE COMPUTER INCORPORATED with headquarters in Cupertino, Calif) running a version of MAC OS X or WINDOWS as its base operating system 26. Although such computers are used extensively in home and business environments, they may lack a native MLS architecture and thus may not be capable of processing and communicating information with other computing systems according to multiple levels of security. Further, when a computer system lacks a trusted computer base, its use in networks having a multi-level security architecture may be limited.

In some embodiments, an MLS architecture may enable advanced security policies. For example, in some embodiments, an MLS architecture may comprise various labeled zones. Each labeled zone may have a security level and comprise a series of files of that security level. In some embodiments, a security level may be indicated by a hex code or other suitable designation. For example, hex code "xFF" may indicate a highest level of security, such as top secret, and hex code "x00" may indicate a lowest level of security, such as unclassified. In some embodiments, a labeled zone may have an intermediate level of security, such as "x0F," "x1A," or "xF1."

In some embodiments, the labeled zones may be segregated, such that files of a labeled zone of a particular security level cannot access files of another labeled zone of a different security level. In other embodiments, the labeled zones may be hierarchical, such that files of a labeled zone may access files of labeled zones of equal or lower security levels, but may not access files of zones of higher security levels. For example, a file of a labeled zone of security level "x0F" may read from or write to a file of a labeled zone of security level "x0F" or "x00," but may not read from or write to a file of a labeled zone of security level "xFF." Thus, in some embodiments, an MLS architecture may allow one-way data flow between security domains that may otherwise be isolated.

In some embodiments, a computing system 12 may implement MLS by utilizing a trusted computing base (TCB). In some embodiments, the MLS architecture and/or the TCB may comprise hardware, software, or a combination thereof. A TCB may enforce various security policies, such as user access control (UAC), discretionary access control (DAC), mandatory access control (MAC), and/or audit policies to facilitate MLS.

In some embodiments, UAC may allow users of a specified identity to access a file. For example, a permission setting may allow "Paul" and "Ringo" to access a file, but may prevent "John," "George," and "Pete" from accessing the file.

In some embodiments, DAC may allow an owner of a file to set accessibility rights to a file based on an identity or a group membership. For example, an owner of a file may allow Paul to read from and write to a file, and may allow any member of a group "The Beatles" to read from the file. The owner may also have the ability to change the accessibility rights after they are initially implemented.

In some embodiments, MAC may comprise a central administrator that controls file accessibility. For example, the central administrator may assign a level of security to each file and a security clearance to each user. When a user attempts to access a file, the security clearance of the user is checked against the security level of the file to determine whether access is allowed. In some embodiments, MAC may be used with UAC and/or DAC. In some embodiments, MAC may take precedence over UAC and/or DAC. For example, if a file is in a labeled zone of security level "xFF," and Paul does not have security clearance for level "xFF," Paul may not access the file, even if the owner of the file has given Paul read permission for the file. In some embodiments, MAC may prevent owners from setting security permissions of files altogether.

In some embodiments, audit policies may identify transactions that are recorded. For example, a system may log the actions that a user takes and/or the actions associated with a particular file. For example, a log may indicate files that Paul attempted to access, the access method, and/or whether the access attempt was successful. As another example, a log may indicate which user tried to access a particular file, the attempted access time, the attempted access method, and the result.

A TCB may allow computing system 12 to implement MLS. In some embodiments, mass storage device 14 may comprise a virtual operating system 16 that incorporates a TCB. The virtual operating system 16 may enable MLS on a computing system 12 that does not natively have an MLS architecture.

Virtual operating system 16 may be any type of operating system that includes a TCB for implementing an MLS architecture and is executable by computing system 12. For example, virtual operating system 16 may be a UNIX based operating system, such as the SOLARIS 10/TX operating system (available from SUN MICROSYSTEMS in Santa Clara, Calif.) or other suitable operating system. In some embodiments, virtual operating system 16 may be stored in a partition of mass storage device 14 that is different from the partition that stores base operating system 26.

In some embodiments, a file created using virtual operating system 16 may comprise a value indicating a level of security and may be associated with a labeled zone. Virtual operating system 16 allows the computing system 12 to process and communicate information according to multiple levels of security, despite the lack of a native MLS architecture of computing system 12.

Mass storage device 14 may also comprise a virtualization tool 28. In some embodiments, the base operating system 26 may execute the virtualization tool 28 before the virtual operating system 16 is executed. In some embodiments, the virtualization tool 28 simultaneously executes secure virtual operating system 16 while the base operating system 26 is executed on the computing system 12. In some embodiments, the virtualization tool 28 may be a software program that executes virtualization functions. For example, the virtualization tool 28 may provide a virtualized set of hardware of computing system 12 (such as a video adapter, network adapter, hard drive adapter, or other suitable hardware) to virtual operating system 16. In some embodiments, virtualization tool 28 may facilitate execution of code of the virtual operating system 16 by the computing system 12. For example, the code of the virtual operating system 16 may be directly executed by one or more processors of computing system 12 and/or translated into a form that is executable by the one or more processors.

In some embodiments, virtualization tool 28 may isolate processes and information between base operating system 26 and virtual operating system 16. For example, in some embodiments, the base operating system 26 may execute the virtualization tool 28, and the virtualization tool 28 may execute the virtual operating system 16. In some embodiments, base operating system 26 may recognize that virtualization tool 28 is being executed and is using a particular amount of memory, but the base operating system 26 may not have access to that memory. Thus, the base operating system 26 may not be capable of accessing the processes or data of programs executed by the virtualization tool 28, such as virtual operating system 16. Thus, secure information of virtual operating system 16 may be isolated from the generally insecure environment of base operating system 26.

Referring back to FIG. 1, in the embodiment depicted, system 10 comprises an MLS gateway 20 coupled to computing system 12. In some embodiments, MLS gateway 20 may comprise an MLS architecture. For example, the MLS gateway may execute a Unix operating system, such as a Solaris 10/TX operating system. In some embodiments, the MLS gateway 20 may support labeled zones. In some embodiments, MLS gateway 20 may be a computing system, a router, a switch, or other suitable device.

In some embodiments, the communication link between computing system 12 and MLS gateway 20 may utilize a Common Internet Protocol Security Option (CIPSO) protocol. A CIPSO protocol may provide a labeling mechanism for packets transmitted between computing system 12 and MLS gateway 20 for maintaining the integrity of the security level of the packets at either end of a connection. For example, a packet transmitted according to CIPSO may indicate a security level of the information included in the packet. In some embodiments this security level is equivalent to the security level of a file that includes the information sent in the packet.

In some embodiments, the MLS gateway 20 may allow the computing system 12 to communicate with one or more secure domains 22. A secure domain 22 may implement an MLS architecture, that is, one or more computing systems of a secure domain 22 may implement MLS. In some embodiments, a plurality of common levels of security may be enforced by computing system 12 and one or more computing systems of secure domains 22. Thus, computing system 12 and a computing system of a secure domain 22 may communicate with each other according to a plurality of security levels.

In some embodiments, system 10 may also comprise a local network 18 that is coupled to computing system 12. Local network 18 may or may not incorporate an MLS architecture. In some embodiments, computing system 12 may have one or more network interface cards 24. In some embodiments, computing system 12 may comprise one or more network adaptors, such as a network interface card 24 that independently couples the computing system 12 to the local network 18 and/or a separate network interface card 24 that independently couples the computing system 12 to the MLS gateway 20. This configuration may provide enhanced security by allowing independent processing of secure information from a secure domain 22 and insecure information from local network 18. In other embodiments, computing system 12 may have a single network interface card 24 that couples computing system 12 to local network 18 and MLS gateway 20. Some embodiments of the system 10 having individual network interface cards 24 for each of the local network 18 and the MLS gateway 20 may provide enhanced security by independently processing secure information on different hardware than the hardware on which insecure information is processed.

Figure 3:
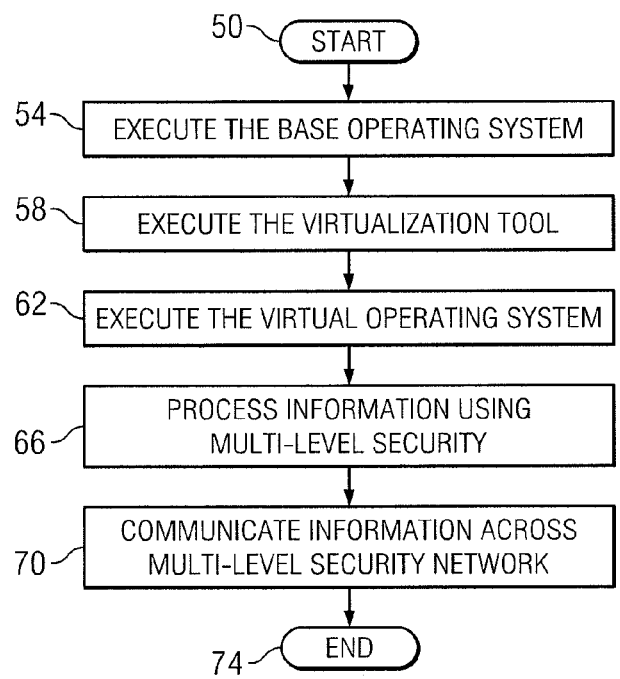
FIG. 3 depicts an example of a method for enabling MLS in a single-level security computing system.

FIG. 3 depicts an example of a method for enabling MLS in a single-level security computing system, such as computing system 12. The flow begins at step 50. At step 54, computing system 12 executes base operating system 26. In some embodiments, code of the base operating system 26 may be loaded from mass storage device 14 and executed by the processors of computing system 12.

At step 58, a virtualization tool 28 is executed. Because the virtualization tool 28 may be executed by the base operating system 26, it is shown within the base operating system 26 of personal computing system 12 in FIG. 4. At step 62, the personal computing system 12 executes virtual operating system 16. In some embodiments, the virtualization tool 28 executes the virtual operating system 16. Accordingly, the virtual operating system 16 is shown within the virtualization tool 28 and the base operating system 26 in FIG. 4.

At step 66, the computing system 12 processes information according to MLS at step 66. The processed information may originate from computing system 12 or may be received from another computing system that implements MLS. For example, a file created by virtual operating system 16 may be assigned a security level. As another example, the TCB of virtual operating system 16 may prevent a user from accessing a file of a particular security level if the user does not have security clearance for that security level. At step 70, the computing system communicates information across a network according to MLS. For example, the computing system 12 may receive and/or send files of a plurality of security levels that are supported by other computing systems of secure domains 22. The method ends at step 74.

Modifications, additions, or omissions may be made to the systems and apparatuses disclosed herein without departing from the scope of the invention. The components of the systems and apparatuses may be integrated or separated. For example, in some embodiments, mass storage device 14 may be an independent device or may be integrated with a larger computing system, such as computing system 12 or a data distribution system that serves storage space to one or more clients. Moreover, the operations of the systems and apparatuses may be performed by more, fewer, or other components. For example, the operations of personal computing device 12 and/or mass storage device 14 may be performed by more than one component. In some embodiments, the base operating system 26, the virtualization tool 28, and/or the virtual operating system 16 may be stored in separate devices. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The method may include more, fewer, or other steps. Additionally, steps may be performed in any suitable order.

A component of the systems and apparatuses, such as computing system 12, MLS gateway 20, and/or mass storage device 14 disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
a first computer system having one or more processors, wherein the first computer system is, by itself, natively operable only at a single security level and does not natively comprise a trusted computing base (TCB);
an external, computer-readable mass storage device operable to be coupled to the first computer system, wherein the external, computer-readable mass storage device is not itself natively part of the first computer system, the external, computer-readable mass storage device comprising:
a base operating system operable to be executed by the one or more processors of the first computer system, the base operating system configured to be bootable by the first computer system, the base operating system natively operable to implement only a single security level;
a virtual operating system operable to be executed by base operating system being executed by the one or more processors of the first computer system, the virtual operating system executed using a virtualization tool executed by the base operating system, the virtual operating system operable to:
implement a multi-level security (MLS) architecture usable by the first computer system;
incorporate the TCB, wherein when the one or more processors of the first computer system execute the virtual operating system, the first computer system is operable to implement the MLS architecture in accordance with the TCB;
process information, using the MLS architecture, according to a plurality of security levels, wherein the plurality of security levels comprises at least a second security level different than the first security level; and
communicate at least a portion of the information processed according to the plurality of security levels from the first computer system to at least a second computer system distinct from the first computer system, the information communicated according to the plurality of security levels of the information; and
an MLS gateway device in operable communication with the first computer system and with at least one security domain separate from the first computer system, the at least one security domain implementing the MLS architecture, wherein:
a plurality of common levels of security are enforced by the first computing system when it executes the virtual operating system;
the plurality of common security levels are enforced by a third computing system disposed within the at least one security domain; and
the first computing system and the third computing system are operable to communicate with each other, using the MLS gateway, according to the plurality of common security levels.

2. The system of claim 1, wherein the virtualization tool is operable to perform at least one of the following functions:
(a) isolate one or more processes of the virtual operating system from the base operating system; and
(b) restrict the base operating system from accessing secure information of the virtual operating system.

3. The system of claim 1, wherein the virtual operating system is operable to communicate at least a portion of the information processed according to the plurality of security levels, to the second computer system, using one or more packets, the packets indicating a security level of the information.

4. The system of claim 1, wherein the virtual operating system is operable to communicate the information processed according to the plurality of security levels to a gateway that supports a plurality of labeled zones of a network.

5. The system of claim 1, wherein at least one of the one or more processors comprises a processor of a MACINTOSH™ personal computer.

6. The system of claim 1, wherein:
the MLS gateway is in operable communication with first and second security domains;
the first computer system further comprises first and second physical network adaptors associated, respectively, with the first and second security domains; and
the virtual operating system is further operable to enable the first computer system to independently process secure information from each of the first and second security domains.

7. A method comprising:
providing a first computer system having one or more processors, wherein the first computer system is, by itself, natively operable only at a single, first security level and does not comprise a trusted computing base (TCB);
providing an external, computer-readable mass storage device operable to be coupled to the first computer system, wherein the external, computer-readable mass storage device is not itself natively part of the first computer system;
executing, by the one or more processors of the first computer system, a base operating system stored on the external, computer-readable mass storage device, wherein the base operating system is natively operable, by itself, to implement only a single security level;
executing a virtual operating system by the one or more processors of the first computer system, the virtual operating system executed using a virtualization tool executed by the base operating system, wherein the virtual operating system implements a multi-level security (MLS) architecture usable by the first computer system and incorporates the TCB, wherein when the one or more processors of the first computer system execute the virtual operating system, the first computer system is operable to implement the MLS architecture in accordance with the TCB;
processing information, by the virtual operating system, using the MLS architecture, according to a plurality of security levels, wherein the plurality of security levels capable of being processed comprises at least one security level different than the first security level;
communicating at least a portion of the information processed according to a plurality of security levels from the first computer system to at least a second computer system distinct from the first computer system, the information communicated according to the plurality of security levels of the information;
providing an MLS gateway device in operable communication with the first computer system and with at least one security domain separate from the first computer system, the at least one security domain implementing the MLS architecture;
enforcing, by the first computer system, when the first computer system executes the virtual operating system, a plurality of common levels of security, wherein the plurality of common security levels also are enforced by a third computing system disposed within the at least one security domain; and
permitting the first computing system and the third computing system to communicate with each other, using the MLS gateway, according to the plurality of common security levels.

8. The method of claim 7, further comprising: using the virtualization tool to perform at least one of the following functions:
(a) isolate one or more processes of the virtual operating system from the base operating system; and
(b) restrict the base operating system from accessing secure information of the virtual operating system.

9. The method of claim 7, further comprising: communicating, by the virtual operating system, at least a portion of the information processed according to a plurality of security levels, from the first computer system to the second computer system, using one or more packets, the packets indicating a security level of the information.

10. The method of claim 7, further comprising communicating, by the virtual operating system: the information at least a portion of the information processed according to the plurality of security levels to a gateway that supports a plurality of labeled zones of a network.

11. The method of claim 7, the one or more processors comprising a processor of a Macintosh™ personal computer.

12. The method of claim 7, further comprising:
enabling the MLS gateway to be in operable communication with first and second security domains; and
providing, to the first computer system, first and second physical network adaptors that are each associated, respectively, with the first and second security domains, so as to enable the first computer system to independently process secure information from each of the first and second security domains.

13. A non-transitory, tangible computer-readable storage medium storing computer-executable code, wherein the computer-executable code, when executed by one or more processors is operable to:
execute a base operating system by one or more processors of a first computer system that is separate and distinct from the non-transitory, tangible computer-readable storage medium, wherein the first computer system is, by itself, natively operable only at a single, first security level and does not natively comprise a trusted computing base (TCB), and wherein, the base operating system is natively, by itself, operable to implement a single security level;
execute a virtual operating system by the one or more processors of the first computer system, the virtual operating system executed using a virtualization tool executed by the base operating system, wherein the virtual operating system implements a multi-level security (MLS) architecture and incorporates the TCB that are both usable by the first computer system, wherein when the one or more processors of the first computer system execute the virtual operating system, the first computer system is operable to implement the MLS architecture in accordance with the TCB;
process, by the virtual operating system, using the MLS architecture, information according to a plurality of security levels, wherein the plurality of security levels capable of being processed comprises at least one security level different than the first security level;
communicate at least a portion of the information processed according to a plurality of security levels from the first computer system to at least a second computer system distinct from the first computer system, the information communicated according to the plurality of security levels of the information;

operably couple the first computer system to an MLS gateway device in operable communication with at least one security domain separate from the first computer system, the at least one security domain implementing the MLS architecture;

enforce, by the first computer system, a plurality of common levels of security when the first computer system executes the virtual operating system, wherein the plurality of common security levels also are enforced by a third computing system disposed within the at least one security domain; and permit the first computing system and the third computing system to communicate with each other, using the MLS gateway, according to the plurality of common security levels.

14. The non-transitory, tangible computer-readable storage medium of claim 13, storing further computer executable code that, when executed by the one or more processors of the computer system, is further operable to perform at least one of the following functions:

(a) isolate one or more processes of the virtual operating system from the base operating system; and (b) restrict the base operating system from accessing secure information of the virtual operating system.

15. The medium of claim 13, further storing further computer executable code that, when executed by the one or more processors of the first computer system, is further operable to: communicate at least a portion of the information processed according to the plurality of security levels, to the second computer system, using one or more packets, the packets indicating a security level of the information.

16. The non-transitory, tangible computer-readable storage medium of claim 13, further storing further computer executable code that, when executed by one or more processors of the first computer system, is further operable to: communicate at least a portion of the information processed according to the plurality of security levels, to a gateway that supports a plurality of labeled zones of a network.

17. The non-transitory, tangible computer-readable storage medium of claim 13, wherein the one or more processors comprise a processor of a Macintosh™ personal computer.

18. The non-transitory, tangible computer-readable storage medium of claim 13, wherein the non-transitory, tangible computer-readable storage medium stores further computer-executable code that, when executed by the one or more processors of the first computer system, is further operable to:

enable the MLS gateway to be in operable communication with first and second security domains; and provide, to the first computer system, access to first and second physical network adaptors that are each associated, respectively, with the first and second security domains, so as to enable the first computer system to independently process secure information from each of the first and second security domains.

* * * * *